United States Patent
Yamane et al.

(10) Patent No.: US 7,322,390 B2
(45) Date of Patent: Jan. 29, 2008

(54) PNEUMATIC TIRE HAVING TREAD WITH BLOCKS HAVING OBTUSE ANGLE CORNER PORTIONS

(75) Inventors: Kenji Yamane, Hiratsuka (JP); Masahiro Ishida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 169 days.

(21) Appl. No.: 10/532,069

(22) PCT Filed: Nov. 27, 2003

(86) PCT No.: PCT/JP03/15184

§ 371 (c)(1),
(2), (4) Date: Apr. 21, 2005

(87) PCT Pub. No.: WO2004/050388

PCT Pub. Date: Jun. 17, 2004

(65) Prior Publication Data
US 2006/0048876 A1   Mar. 9, 2006

(30) Foreign Application Priority Data
Dec. 3, 2002   (JP) .............................. 2002-351304

(51) Int. Cl.
B60C 11/13   (2006.01)
(52) U.S. Cl. .................... 152/209.18; 152/209.24; 152/209.27
(58) Field of Classification Search ........... 152/209.15, 152/209.18, 209.24, 209.26, 209.27, 209.28
See application file for complete search history.

(56) References Cited

U.S. PATENT DOCUMENTS

| 2,878,852 | A | * | 3/1959 | Lippmann et al. | ....... 152/209.2 |
| 5,567,253 | A | | 10/1996 | Iwamura | |
| 5,766,383 | A | | 6/1998 | Hasegawa et al. | |
| 5,996,661 | A | * | 12/1999 | Gerresheim et al. | ... 152/209.28 |
| 6,119,745 | A | | 9/2000 | Sugihara | |
| 6,340,040 | B1 | * | 1/2002 | Ikeda | ..................... 152/209.27 |

FOREIGN PATENT DOCUMENTS

DE   4239475 A1   5/1994

(Continued)

OTHER PUBLICATIONS

PCT International Search Report for PCT/JP03/15184 mailed on Mar. 9, 2004.

*Primary Examiner*—Steven D. Maki
(74) *Attorney, Agent, or Firm*—Greer, Burns & Crain, Ltd.

(57) ABSTRACT

A tread surface, the tire rotational direction of which is specified in one direction, has a center region. Blocks having obtuse-angled corner portions and acute-angled corner portions are defined in the center region by at least one first circumferential groove extending in a circumferential direction of the tire on one side of the tire centerline, and first lateral grooves which extend outwardly in a widthwise direction of the tire from the first circumferential groove so as to incline towards a direction of reverse rotation of the tire and are disposed at predetermined intervals in the tire circumferential direction. Groove wall surfaces located on both sides of the obtuse-angled corner portion of each block facing to the first circumferential groove are inclined such that the inclination angles thereof are gradually greater towards the obtuse-angled corner portion and are maximum at the obtuse-angled corner portion.

2 Claims, 1 Drawing Sheet

FOREIGN PATENT DOCUMENTS

| | | | |
|---|---|---|---|
| EP | 602989 | * | 6/1994 |
| EP | 0 997 323 A2 | | 5/2000 |
| EP | 1 106 395 A2 | | 6/2001 |
| JP | 62-026104 | * | 2/1987 |
| JP | 64-036505 | * | 2/1989 |
| JP | 03074208 A | | 3/1991 |
| JP | 04-345503 A1 | | 12/1992 |
| JP | 06-106915 | | 4/1994 |
| JP | 6-270609 | * | 9/1994 |
| JP | 07-040712 | | 2/1995 |
| JP | 07-164829 A1 | | 6/1995 |
| JP | 8-142613 | * | 6/1996 |
| JP | 264499 | | 5/1997 |
| JP | 09-220912 A1 | | 8/1997 |
| JP | 10-016515 | * | 1/1998 |
| JP | 10-297220 A1 | | 11/1998 |
| JP | 11-091313 A1 | | 4/1999 |
| JP | 11-227420 | * | 8/1999 |
| JP | 3162866 | | 2/2001 |
| JP | 2001-206017 | | 7/2001 |
| JP | 2002-059711 | * | 2/2002 |
| JP | 2002-059711 A1 | | 2/2002 |

* cited by examiner

PNEUMATIC TIRE HAVING TREAD WITH BLOCKS HAVING OBTUSE ANGLE CORNER PORTIONS

TECHNICAL FIELD

The present invention relates to pneumatic tires, and more particularly, to a pneumatic tire capable of improving irregular wear created in running a circuit or the like where a large lateral acceleration is applied thereto during turning.

TECHNICAL BACKGROUND

Conventionally, there are proposed many pneumatic tires having a tread surface which is provided with a directional tread pattern the tire rotational direction of which is specified in one direction. In the pneumatic tires having such a directional tread pattern, there are pneumatic tires including a tread surface having circumferential grooves disposed on both sides of a centerline of the tire, and lateral grooves extending outward in a widthwise direction of the tire from the circumferential grooves so as to incline towards the tire reverse rotation direction to thereby define rhomboid-shaped or parallelogram-shaped blocks having obtuse-angled corner portions and acute-angled corner portions in its center region (for example, see Unexamined Japanese Patent Application Publication No. 11-91313).

In recent years, circuit courses are opened up to general car users, and the users often have chances to make their cars run a circuit course. When running such a circuit course, a lateral acceleration acting during turning is much greater, compared with that in normal driving when running a public road, and irregular wear different from that in the normal driving is, therefore, created.

In the pneumatic tires having the above-mentioned directional pattern of blocks, there is a problem of occurrence of irregular wear such that the obtuse-angled corner portions of the blocks facing to the circumferential grooves, that is, the obtuse-angled corner portions located on the kicking-out sides of the blocks wear more slowly than other parts thereof.

DISCLOSURE OF THE INVENTION

An object of the present invention is to provide a pneumatic tire which can improve irregular wear produced in running a circuit or the like where a large lateral acceleration is applied thereto during turning.

In order to achieve the above object, a pneumatic tire according to present invention includes a tread surface having a direction of rotation of the tire which is specified in one direction, the tread surface having a center region which includes at least one first circumferential groove extending in a circumferential direction of the tire on one side of a centerline of the tire, first lateral grooves which extend outwardly in a widthwise direction of the tire from the first circumferential groove so as to incline towards a direction of reverse rotation of the tire being disposed at predetermined intervals in the tire circumferential direction, blocks which have obtuse-angled corner portions and acute-angled corner portions being defined by the first circumferential groove and the first lateral grooves, wherein groove wall surfaces located on both sides of the obtuse-angled corner portion of each of the blocks facing to the first circumferential groove are inclined such that the inclination angles thereof are gradually greater towards the obtuse-angled corner portion and are maximum at the obtuse-angled corner portion.

According to the present invention described above, rigidity of the kicking-out side obtuse-angled corner portions increases, which allows for a more even distribution of ground contact pressure of the blocks in running a circuit or the like where a great lateral acceleration acts during turning. As a result, irregular wear resistance can be improved, and steering stability during turning can also be enhanced.

BEST MODES FOR CARRYING OUT THE INVENTION

An embodiment of the present invention will be described in detail below with reference to the drawings.

Figure 1:
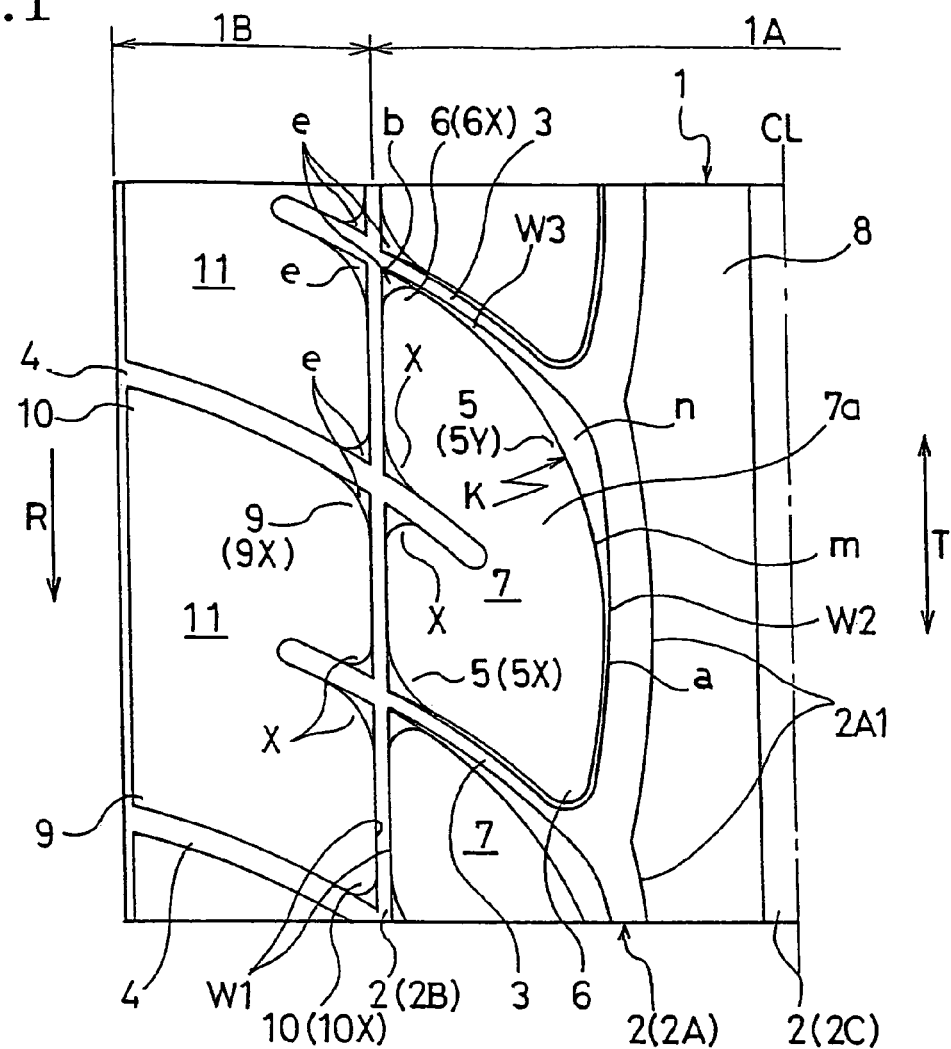
FIG. 1 is a partial development view showing an embodiment of a pneumatic tire according to the present invention, in which one side of the tread surface with respect to the centerline of the tire is developed.

Referring to FIG. 1, there is shown an embodiment of a pneumatic tire according to the present invention, and a tread surface 1, the tire rotational direction R of which is specified in one direction shown by an arrow, has a plurality of circumferential grooves 2 extending along a circumferential direction T of the tire. The plurality of circumferential grooves 2 includes two first circumferential grooves 2A disposed on both sides of a centerline CL of the tire in a center region 1A of the tread surface 1, a second circumferential groove 2B disposed at a location defining the center region 1A and each of shoulder regions 1B on both sides of the center region, and a third circumferential groove 1C disposed on the tire centerline CL.

Each of the first circumferential grooves 2A extends in the tire circumferential direction T, and is composed of a plurality of circularly curved groove portions 2A1, which are convex towards the tire centerline CL and are connected to one another. Each of the groove portions 2A1 is in the form of a circular arc having a large radius of curvature, and each first circumferential groove is a so-called see-through groove, which can be seen through from one end to the other end of the second circumferential groove 2B when the tread surface 1 is fully developed.

Each second circumferential groove 2B extends straight along the tire circumferential direction T, and has a groove width which is less than the groove width of the first circumferential grooves 2A.

The third circumferential groove 2C also extends straight along the tire circumferential direction T, and has a groove width which is greater than the groove width of the first circumferential grooves 2A.

Disposed at predetermined intervals along the tire circumferential direction T are first lateral grooves 3 extending outward in a widthwise direction of the tire from each of the first circumferential grooves 2A so as to incline towards a direction of reverse rotation of the tire, and a plurality of blocks 7 having a diagonal pair of obtuse-angled corner portions 5 and a diagonal pair of acute-angled corner portions 6 are defined by the circumferential grooves 2A and 2B and the first lateral grooves 3 in the center region 1A. Ribs 8 extending along the tire circumferential direction T are formed between the circumferential grooves 2A and 2C.

Disposed at predetermined intervals along the tire circumferential direction T are second lateral grooves 4 extending outward in the tire widthwise direction from each of the second circumferential grooves 2B so as to incline towards the tire reverse rotation direction, and a plurality of blocks 11 having a diagonal pair of obtuse-angled corner portions 9 and a diagonal pair of acute-angled corner portions 10 are defined by the circumferential grooves 2B and the second lateral grooves 4 in the shoulder regions 1B.

The first lateral grooves 3 each have an inner terminal end which is in communication with a connecting part between the circularly curved groove portions 2A1. The outer end side of each first lateral groove 3 extends into each block 11 so as to cross and communicate with the second lateral groove 2A, and the outer terminal end thereof is located within each block 11.

The second lateral grooves 4 are displaced substantially one-half of the intervals from the first lateral grooves 3, and are substantially centrally located between the first lateral grooves 3. The inner end side of each second lateral groove 4 extends into each block 7, and the inner terminal end thereof is located substantially centrally of each block 7.

The corner portions 5X, 6X, 9X, 10X and X of the blocks 7 and 11 facing to the second circumferential grooves 2B each have a groove wall edge section which is formed to have a chamfered face e which is circularly curved in cross section. The chamfered faces e are inclined such that the inclination angles thereof with respect to the tire radial direction are greater than those of the groove wall surfaces W1 of the blocks facing to the second circumferential grooves 2b, which increases block rigidity of the corner portions in the areas where noise is apt to be created, thereby suppressing generation of noise due to slippage of the block corner portions.

Groove wall surfaces W2 and W3 located on both sides of the obtuse-angled corner portion, namely the kicking-out side obtuse-angled corner portion 5Y, of each of the blocks 7 facing to the first circumferential grooves 2A are inclined such that the inclination angles thereof are gradually greater towards the obtuse-angled corner portion 5Y, and the inclination angles thereof are maximum at the obtuse-angled corner portion 5Y. The obtuse-angled corner portion 5Y has a groove wall edge section which is formed to have a chamfered face n which is circularly curved in cross section.

It was very hard to learn the ground contact state of a tire when running a circuit where a lateral acceleration acting during turning was much greater, compared with that in normal driving, before. However, with progress in hardware recently, the ground contact state of a tire has been possible to be simulated under such conditions. As a result of the simulation, it has been realized that a force acts substantially at a right angle to the tire during turning in a circuit, and the tread surface contacts with the ground with its ground contact shape being substantially of a triangle the top of which is located on the force acting side. The ground contact state showed that the ground contact pressure on the kicking-out side obtuse-angled corner portions 5Y of the blocks 7 in the center region 1A was greatly lowered and the corner portions 5Y slipped in kicking out. It has turned out that, due to the slipping, the corner portions 5Y wear slower and irregular wear which is different from that in normal driving is created. In the normal driving, kicking-out side acute-angler corner portions 6X are lower in ground contact pressure, thereby causing irregular wear such that the acute-angled corner portions wear slower.

According to the present invention, on the basis of the above knowledge, the groove wall surfaces W2 and W3 located on both sides of the obtuse-angled corner portion 5Y of each block 7 are inclined such that the inclination angles thereof are gradually greater towards the obtuse-angled corner portion 5Y, and the inclination thereof is maximum at the obtuse-angled corner portion 5Y, as described above. This increases rigidity of the kicking-out side corner portions 5Y, and allows for an even distribution of ground contact pressure of the blocks 7 in running a circuit or the like where a great lateral acceleration acts during turning. Accordingly, irregular wear can be suppressed, and steering stability during turning can also be improved.

Figure 2:
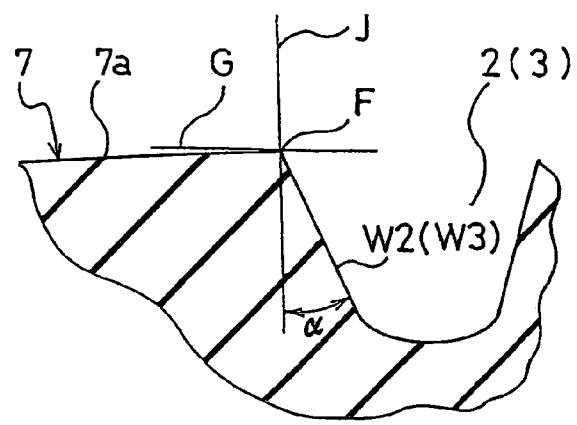
FIG. 2 is a partial enlarged cross-sectional view of the block.

In the present invention, the inclination angles of parts of the groove wall surfaces in the obtuse-angled cornet portion 5Y where the inclination angels are maximum are preferably in the range of 10 to 40 degrees. If the inclination angles thereof are less than 10 degrees, it is difficult to effectively improve irregular wear. If the inclination angles thereof are greater than 40 degrees, the first circumferential grooves 2A are wider in width at each part adjacent thereto, thereby increasing the ground contact pressure on the edge sections of the acute-angled corner portions 6 opposite the obtuse-angled portions 5Y. As a result, the edge sections of the acute-angled corner portions 6 wear rapidly and another irregular wear is created. On the other hand, if the inclination angles thereof are greater than 40 degrees with the ground contact area of each block 7 maintained, the first circumferential grooves 2A decrease in volume to thereby degrade wet performance. The inclination angles thereof are desirably in the range of 20 to 30 degrees. Note that the inclination angle of the groove wall surface referred to in the present invention is, as shown in FIG. 2, an angle $\alpha$ between the groove wall surface W2 or W3 and a straight line J orthogonal to a line G tangent to the top surface 7a of the block 7 at an intersection F of the groove wall surface W2 or W3 and the top surface 7a.

The starting positions a and b from which the groove wall surfaces W2 and W3 make their inclination angles greater towards the obtuse-angled corner portion 5Y are located on the acute-angled corner portion 6 sides from the central positions of the groove direction lengths of the groove wall surfaces W2 and W3, and preferably, the groove wall surfaces W2 and W3 are inclined such that their inclination angles are gradually greater from the acute-angled corner portions 6 towards the obtuse-angled corner portion 5Y.

In the case where, as described above, the groove wall edge section of each obtuse-angled corner portion 5Y has a circularly curved chamfered face n, a ridge line m between the top surface 7a of the block 7 and the groove wall surfaces W2 and W3 connected thereto is preferably in the form of a circular arc having a single curvature radius K.

In the above embodiment, the present invention shows a pneumatic tire also having blocks 11 in the shoulder regions 1B, but is not limited thereto. The present invention is preferably applicable to any of pneumatic tires including blocks having obtuse-angled corner portions 5 and acute-angled corner portions 6, defined by the first circumferential groove 2A disposed on one side of the tire centerline CL and the first lateral grooves 3 in a tread surface 1 the tire rotational direction R of which is specified in one direction.

The present invention is preferably applicable to pneumatic tires for passenger cars, especially employed for high performance vehicles with a large engine size.

EXAMPLE

Tires according to the present invention and prior art were prepared, respectively, having a tire size of 235/45ZR17; the present invention tires had a construction shown in FIG. 1, and were arranged such that the groove wall surfaces located on both sides of the kicking-out side obtuse-angled corner portion of each of the blocks were inclined such that the inclination angles thereof were gradually greater from 10 degrees towards the obtuse-angled corner portion and had the maximum angles of 30 degrees at the obtuse-angled corner portion; the prior art tires had the same constructions as the present invention tires except that the groove wall surfaces thereof had the same inclination angles of 5 degrees.

The test tires were seated on 17×8JJ sized rims, inflated to an air pressure of 230 kPa, and mounted on a passenger car of 3 liter displacement; the evaluation tests for irregular wear resistance and turning performance were carried out in the following measurement methods, obtaining the results shown in Table 1.

Irregular Wear Resistance

The car was run on a dry asphalt road surface, drawing a figure-8 with a lateral acceleration acting upon the car being 0.76G, and after repeating it 500 times, the remaining amounts of each obtuse-angled corner portion and each acute-angled corner portion on the kicking-out side of the block were measured; the evaluation results were represented by an index where the prior art tire is 100. The greater the index value, the smaller the difference between the remaining amounts of the obtuse-angled corner portions and acute-angled corner portions on the kicking-out side and thus the better the irregular wear resistance.

Turning Performance

The car was run on a dry asphalt road surface, drawing a circle having a radius of 30 meters, and the maximum lateral acceleration was measured acting thereupon; the evaluation results were represented by an index where the prior art tire is 100. The greater the index value, the higher the maximum lateral acceleration and thus the better the steering stability during turning.

TABLE 1

|  | Prior Art Tire | Present Invention Tire |
|---|---|---|
| Irregular Wear Resistance | 100 | 137 |
| Turning Performance | 100 | 105 |

As can be seen from Table 1, the tires according to the present invention can improve irregular wear resistance and enhance turning performance.

As having been illustrated above, according to the present invention, the groove wall surfaces located on both sides of the kicking-out side obtuse-angled corner portions of the blocks facing to the circumferential groove disposed on a side of the tire centerline, are inclined such that the inclination angles thereof are gradually greater towards the obtuse-angled corner portion and are maximum at the obtuse-angled corner portion, which allows for an even distribution of ground contact pressure of the blocks in running a circuit or the like where a great lateral acceleration acts during turning. Accordingly, irregular wear resistance can be improved, and steering stability during turning can also be enhanced.

INDUSTRIAL APPLICABILITY

The present invention having the aforementioned excellent effects is very effectively applicable to pneumatic tires employed when general car users make their cars run a circuit or the like in which a large lateral acceleration is applied thereto during turning.

What is claimed is:

1. A pneumatic tire having a tread surface having a direction of rotation of the tire which is specified in one direction, the tread surface having a center region which includes at least one first circumferential groove extending in a circumferential direction of the tire on one side of a centerline of the tire, first lateral grooves which extend outwardly in a widthwise direction of the tire from the first circumferential groove so as to incline towards a direction of reverse rotation of the tire being disposed at predetermined intervals in the tire circumferential direction, blocks which have obtuse-angled corner portions and acute-angled corner portions being defined by the first circumferential groove and the first lateral grooves, wherein groove wall surfaces located on both sides of the obtuse-angled corner portion of each of the blocks facing to the first circumferential groove are inclined such that the inclination angles thereof are gradually greater towards the obtuse-angled corner portion and are maximum at the obtuse-angled corner portion, wherein the at least one first circumferential groove comprises two first circumferential grooves, each first circumferential groove being provided on each side of the tire centerline, a second circumferential groove which extends in the tire circumferential direction being disposed at a location that defines the center region and each of shoulder regions of the tread surface, the first lateral grooves being in communication with the second circumferential groove, the blocks being defined by the first and second circumferential grooves and the first lateral grooves in the center region of the tread surface and each having a diagonal pair of obtuse-angles corner portions and a diagonal pair of acute-angled corner portions, wherein each of the first circumferential grooves is composed of a plurality of circularly curved groove portions which extend in the tire circumferential direction, the groove portions being convex towards the tire centerline and connected to one another.

2. A pneumatic tire according to claim 1, wherein the first lateral grooves extend outwardly in the tire widthwise direction beyond the second circumferential groove from the connecting parts of the circularly curved groove portions.

* * * * *